(12) United States Patent
Correia et al.

(10) Patent No.: US 8,591,189 B2
(45) Date of Patent: Nov. 26, 2013

(54) BIFEED SERPENTINE COOLED BLADE

(75) Inventors: Victor Hugo Silva Correia, Milton Mills, NH (US); Robert Francis Manning, Newburyport, MA (US); Bhanu Mahasamudram Reddy, Boxford, MA (US)

(73) Assignee: General Electric Company, Schenectady, NY (US)

( * ) Notice: Subject to any disclaimer, the term of this patent is extended or adjusted under 35 U.S.C. 154(b) by 1597 days.

(21) Appl. No.: 11/602,137

(22) Filed: Nov. 20, 2006

(65) Prior Publication Data
US 2008/0118366 A1 May 22, 2008

(51) Int. Cl.
*F01D 5/18* (2006.01)

(52) U.S. Cl.
USPC ...................................... 416/96 R; 416/97 R

(58) Field of Classification Search
USPC ................. 415/115, 116; 416/96 R, 97 R
See application file for complete search history.

(56) References Cited

U.S. PATENT DOCUMENTS

| | | | |
|---|---|---|---|
| 3,706,508 A * | 12/1972 | Moskowitz et al. | 415/115 |
| 4,073,599 A | 2/1978 | Allen et al. | |
| 4,775,296 A | 10/1988 | Schwarzmann et al. | |
| 4,992,026 A | 2/1991 | Ohtomo et al. | |
| 5,395,212 A | 3/1995 | Anzai et al. | |
| 5,403,159 A | 4/1995 | Green et al. | |
| 5,462,405 A | 10/1995 | Hoff et al. | |
| 5,564,902 A | 10/1996 | Tomita | |
| 5,902,093 A | 5/1999 | Liotta et al. | |
| 5,967,752 A | 10/1999 | Lee et al. | |
| 6,126,396 A * | 10/2000 | Doughty et al. | 416/97 R |
| 6,340,047 B1 | 1/2002 | Frey | |
| 6,481,967 B2 | 11/2002 | Tomita et al. | |
| 6,491,496 B2 | 12/2002 | Starkweather | |
| 6,607,356 B2 | 8/2003 | Manning et al. | |
| 6,832,889 B1 | 12/2004 | Lee et al. | |
| 2002/0119045 A1* | 8/2002 | Starkweather | 416/97 R |
| 2006/0062671 A1* | 3/2006 | Lee et al. | 416/92 |

FOREIGN PATENT DOCUMENTS

| | | |
|---|---|---|
| DE | 102004037444 | 10/2005 |
| EP | 1361337 | 11/2003 |
| JP | 58170801 | 10/1983 |
| JP | 2006185301 | 7/1994 |
| JP | 2008260901 | 10/1996 |
| JP | 2001012205 | 1/2001 |
| JP | 2003322002 | 11/2003 |

OTHER PUBLICATIONS

U.S. Appl. No. 11/494,378, filed Jul. 27, 2006, Applicant: C-P. Lee et al.

Herbiet, J., European Search Report for application EP 07116280, Oct. 18, 2012.

* cited by examiner

*Primary Examiner* — Dwayne J White
(74) *Attorney, Agent, or Firm* — General Electric Company; David J. Clement; Matthew P. Hayden

(57) ABSTRACT

A turbine blade includes forward and aft serpentine cooling circuits terminating in corresponding forward and aft impingement channels. Each serpentine circuit has two metered inlets for distributing primary inlet flow to the first passes thereof and supplemental inlet flow to the last passes thereof.

18 Claims, 4 Drawing Sheets

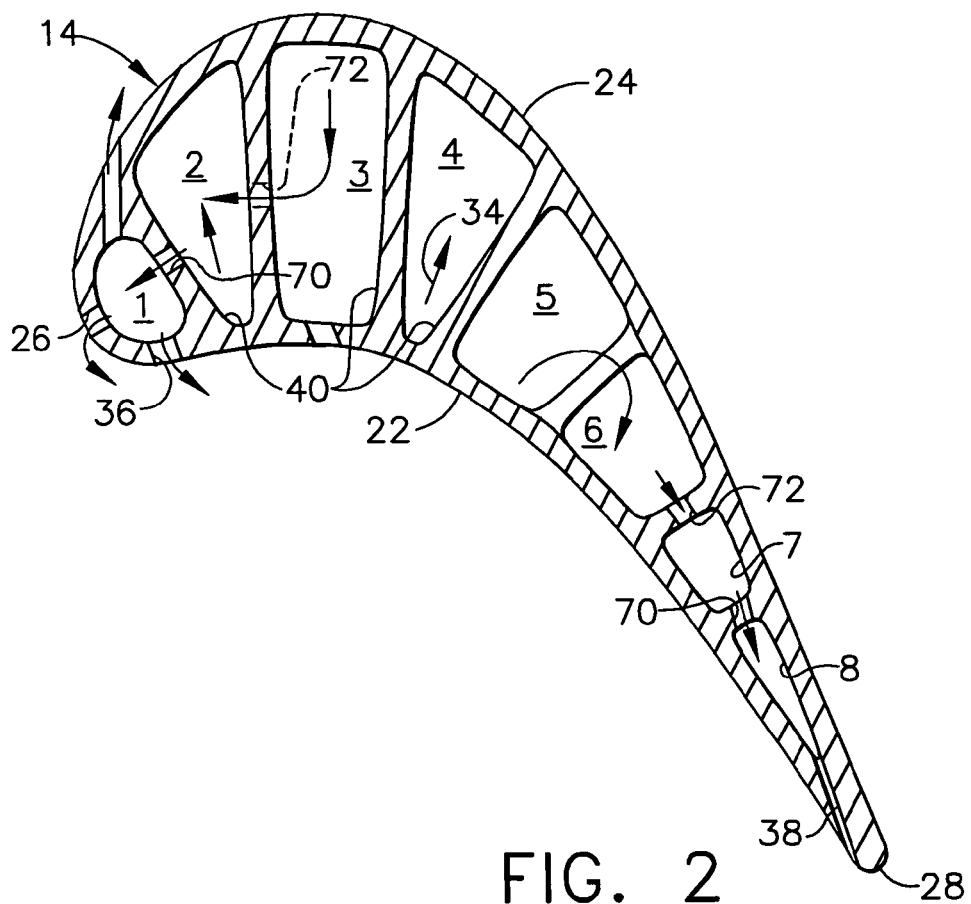
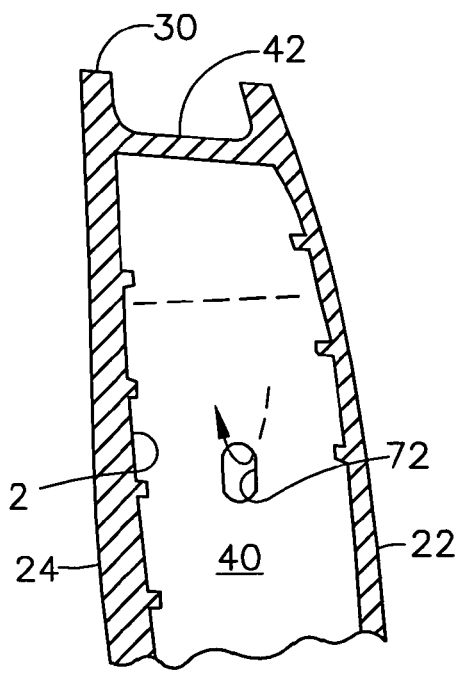
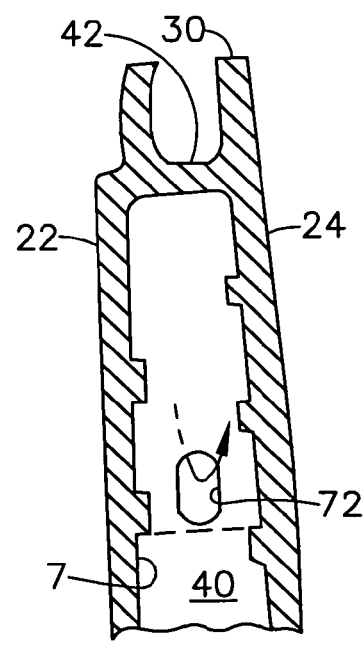
FIG. 2
FIG. 3
FIG. 4

BIFEED SERPENTINE COOLED BLADE

The U.S. Government may have certain rights in this invention pursuant to contract number N00019-03-C-0361 awarded by the U.S. Department of the Navy.

BACKGROUND OF THE INVENTION

The present invention relates generally to gas turbine engines, and, more specifically, to turbine blade cooling.

In a gas turbine engine, air is pressurized in a compressor and mixed with fuel in a combustor for generating hot combustion gases. Energy is extracted from the gases in high and low pressure turbines which power the compressor and a fan in an exemplary turbofan aircraft engine configuration.

The first stage turbine rotor blades receive hot combustion gases from their corresponding turbine nozzle directly from the combustor. The turbine blades are therefore made of superalloy metal having enhanced strength at the high operating temperature of the turbine. And, the blades are typically hollow and internally cooled by bleeding a portion of pressurized air from the compressor.

The cooling air bled from the compressor bypasses the combustor and correspondingly reduces efficiency of the engine. Accordingly, the total amount of air bled from the compressor for cooling the turbine blades should be minimized while correspondingly maximizing the useful life thereof which can reach thousands of hours of operation, with corresponding periodic inspection and maintenance.

The prior art is replete with many patents having myriad configurations for efficiently cooling turbine rotor blades which are based on the particular configuration of the engine and operating cycle. The complexity of blade cooling configurations is also based on the varying distribution of pressure and heat loads around the concave pressure side of the airfoil and the convex suction side which extend radially in span from root to tip and axially in chord between opposite leading and trailing edges.

The life of the typical turbine blade is limited by any local hot spot experienced thereby which increases the thermal distress experienced by the blade eventually leading to undesirable airfoil cracking for example. The airfoil has relatively thin walls, and any thermal crack developed therein during operation can lead to undesirable leakage of the internal cooling air.

Airfoil cracking due to thermal distress typically occurs at the airfoil tip which is subject to heating by the combustion gases not only from the opposite pressure and suction sides of the airfoil, but also from combustion gases leaking over the tip in the small radial clearance or gap provided with the surrounding turbine shroud.

Accordingly, it is desired to provide a turbine blade having an improved cooling configuration for accommodating tip cracking experienced in later blade life.

BRIEF DESCRIPTION OF THE INVENTION

A turbine blade includes forward and aft serpentine cooling circuits terminating in corresponding forward and aft impingement channels. Each serpentine circuit has two metered inlets for distributing primary inlet flow to the first passes thereof and supplemental inlet flow to the last passes thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is a radial sectional view through the blade illustrated in FIG. 1 and taken along line 2-2.

FIG. 3 is an elevational sectional view through a portion of the first serpentine cooling circuit illustrated in FIG. 1 and taken along line 3-3.

FIG. 4 is an elevational sectional view through a portion of the second serpentine cooling circuit illustrated in FIG. 1 and taken along line 4-4.

DETAILED DESCRIPTION OF THE INVENTION

Figure 1:
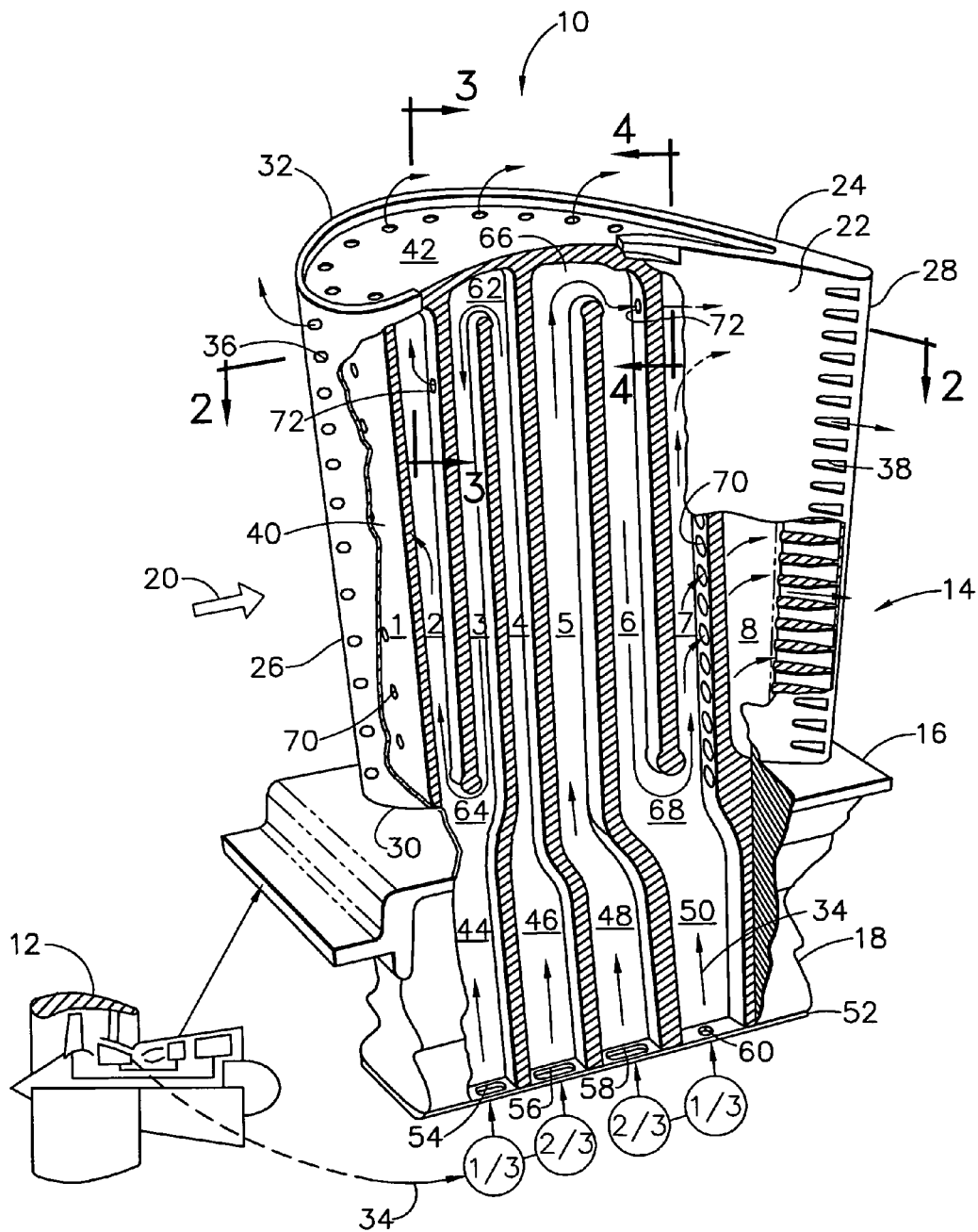
FIG. 1 is a partly sectional isometric view of an exemplary first stage turbine rotor blade.

FIG. 1 illustrates an exemplary first stage turbine rotor blade 10 for use in the high pressure turbine (HPT) of a gas turbine engine 12. The blade is typically cast from superalloy metal with an airfoil 14, platform 16 at the root thereof, and a supporting dovetail 18 in an integral, one-piece assembly.

The dovetail 18 may have any conventional form, such as the axial-entry dovetail illustrated, which mounts the blade in a corresponding dovetail slot in the perimeter of a supporting rotor disk (not shown). The disk holds a full row of the blades spaced circumferentially apart from each other to define interblade flow passages therebetween.

During operation, combustion gases 20 are generated in the combustor of the engine and suitably channeled downstream over the corresponding turbine blades 10 which extract energy therefrom for powering the supporting rotor disk. The individual platform 16 provides a radially inner boundary for the combustion gases and adjoins adjacent platforms in the full row of turbine blades.

The airfoil 14 illustrated in FIGS. 1 and 2 includes circumferentially or transversely opposite pressure and suction sides 22,24 extending axially in chord between opposite leading and trailing edges 26,28 and extends radially in span from the airfoil root 30 to terminate in a radially outer tip cap, or tip, 32. The airfoil pressure side 22 is generally concave between the leading and trailing edges and complements the generally convex airfoil suction side 24 between the leading and trailing edges.

The external surfaces of the pressure and suction sides 22,24 of the airfoil have the typical crescent shape or profile conventionally configured for effecting corresponding velocity and pressure distributions of the combustion gases thereover during operation for maximizing energy extraction from the gases.

The airfoil 14 is typically hollow and includes an internal cooling circuit which may have any conventional configuration, such as the illustrated two three-pass serpentine circuits that terminate in corresponding flow passages behind the leading edge and in front of the trailing edge. The cooling circuits extend through the platform and dovetail with corresponding inlets in the base of the dovetail for receiving pressurized cooling air 34 from the compressor of the engine 12 in any conventional manner.

In this way, the blade is internally cooled from root to tip and between the leading and trailing edges by the internal cooling air which then may be discharged through the thin airfoil sidewalls in various rows of film cooling holes 36 of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots 38 for discharging a portion of the spent cooling air.

As shown in FIGS. 1 and 2, the hollow airfoil 14 includes a plurality of partitions or ribs 40 extending radially in span from root to tip which integrally join together the opposite pressure and suction sides 22,24 to define the internal cooling circuits. The partitions 40 are spaced chordally apart between the opposite leading and trailing edges 26,28 to define a plurality of radially extending flow channels 1-8 adjoining each other from the leading edge to the trailing edge.

The several flow channels or passages 1-8 typically have different cross sectional flow areas in the different portions of the airfoil from root to tip and between the leading and trailing edges for maximizing cooling efficiency for the different external heat loads from the combustion gases. The flow channels may have various forms of cooling enhancement, such as conventional turbulators for increasing heat transfer capability.

The eight flow channels illustrated in FIGS. 1 and 2 are specifically configured in two independent forward and aft serpentine cooling circuits, each terminating in a corresponding impingement cooling channel at the opposite leading and trailing edges of the airfoil.

The forward or first serpentine circuit includes a forward or first up channel or pass 4 extending in span along the forward side of the imperforate midchord partition which extends fully from the base of the dovetail to the airfoil tip. The first pass 4 is followed in turn by a second or middle down channel or pass 3, and then again followed in turn by the third or last up channel or pass 2 to create the three-pass forward serpentine circuit 4-3-2.

Similarly, the second or aft serpentine circuit includes a first up channel or pass 5 extending in span along the aft side of the imperforate midchord partition which is joined in turn to a second or middle down channel or pass 6, which in turn is joined to the third or last up channel or pass 7 to create the three-pass aft serpentine circuit 5-6-7.

Accordingly, the forward serpentine circuit 2-4 extends through the airfoil 14 forward from the midchord thereof toward the leading edge 26, and the aft serpentine circuit 5-7 extends through the airfoil aft from the midchord and aft behind the forward serpentine circuit toward the trailing edge 28.

The forward serpentine circuit terminates in its last pass 2 in a first or forward impingement cooling circuit 1 located directly behind the leading edge. The aft serpentine circuit terminates in its last pass 7 in a second or aft impingement cooling channel 8 directly before the trailing edge.

In this way, the spent cooling air from both serpentine circuits may be discharged separately in impingement inside the opposite leading and trailing edges of the airfoil for providing locally enhanced internal impingement cooling thereof.

The airfoil tip 32 illustrated in FIG. 1 may have any conventional configuration and typically includes small radial extensions of the airfoil sidewalls which extend outwardly from a common tip floor 42 which directly covers the internal serpentine circuits and impingement channels.

The tip floor 42 is a thin plate recessed radially inwardly from the outer tip 32 and contains or bounds the internal cooling circuits for retaining the internal cooling flow therein.

The tip floor typically has small aperture outlets for discharging the spent internal cooling air and further cooling the airfoil tip itself.

The serpentine circuits and impingement channels extend the full radial span of the airfoil 14 from root to tip. The cooling circuits commence at the platform and are provided with the cooling airflow 34 through the platform and dovetail. More specifically, four independent and distinct inlet channels 44,46,48,50 extend from the base of the dovetail, through the dovetail and supporting shank, and through the platform to feed the internal cooling circuits.

The first inlet channel 44 extends through the dovetail 18 to join the forward serpentine circuit at the last pass 2 thereof which feeds the forward impingement channel 1.

The second inlet channel 46 extends through the dovetail 18 to join the forward serpentine circuit at the first pass 4 thereof.

The third inlet channel 48 extends through the dovetail to join the aft serpentine circuit at the corresponding first pass 5 thereof.

And, the fourth inlet channel 50 joins the aft serpentine circuit at the last pass 7 thereof which feeds the aft impingement channel 8.

Correspondingly, a metering plate 52 is suitably joined to the base of the dovetail 18, by brazing for example, to cover the four inlet channels 44-50 and preferentially distribute or meter the limited cooling flow 34 differently through the four inlet channels to control the different cooling performance in the forward and aft portions of the airfoil.

The metering plate 52 includes four aperture inlets 54,56, 58,60 individually sized in flow area to correspondingly meter the cooling flow 34 therethrough and into the corresponding four inlet channels 44-50. The four inlet channels extending through the airfoil dovetail have relatively large cross sectional flow areas and are separated from each other by relatively thin, imperforate partitions to minimize blade weight and therefore minimize undesirable centrifugal loads in the blade during rotary operation in the gas turbine engine.

The flow areas of the four inlet channels are therefore typically larger than the individual flow channels of the two serpentine circuits fed thereby, and therefore the metering plate 52 is used to control the relative distribution of the cooling flow through the internal cooling circuits.

The four inlets 54-60 are accordingly individually smaller in flow area than the corresponding four inlet channels 44-50 and are sized to provide dual feed or bifeed cooling air to each of the two serpentine cooling circuits. Conventional practice is to feed a serpentine cooling circuit only at its first up pass and allow the cooling air to absorb heat in the following serpentine passes.

In contrast, each serpentine circuit illustrated in FIG. 1 has a primary inlet or feed channel defined by the corresponding second and third inlet channels 46,48 at the midchord of the airfoil, and a secondary or supplemental feed channel defined by the corresponding first and fourth inlet channels 44,50, respectively.

In this way, a majority of the available cooling air enters the two serpentine circuits through their first up passes 4,5 and cools the midchord region of the airfoil through the middle or second down passes 3,6.

The supplemental inlet channels 44,50 then introduce additional cooling flow directly at the start of the corresponding last or third up passes 2,7 which in turn feed the forward and aft impingement channels 1,8 for correspondingly internally cooling the leading and trailing edges of the airfoil.

The fresh supplemental cooling air joins the spent primary cooling air at the last serpentine passes 2,7 for substantially improving cooling performance of the leading and trailing edge portions of the airfoil to reduce the operating temperature thereof, but at the expense of less cooling of the midchord region of the airfoil which therefore operates at a higher temperature due to a reduction in flowrate of the primary cooling flow.

It is recognized that only a given or total amount of cooling flow is available for the entire turbine blade and must be distributed therein selectively for maximizing cooling performance of the blade. By redistributing the limited cooling flow through the blade as described above the midchord region of the airfoil is operated hotter and the opposite leading and trailing edges of the airfoil are operated cooler than they otherwise would be, which in turn reduces differential temperatures over the airfoil and reduces the corresponding thermal stresses therein.

Each of the two serpentine circuits illustrated in FIG. 1 includes only three radial passes which alternate in the span direction of the cooling flow between the airfoil root and tip, and therefore include corresponding flow turns or bends in which the direction of the cooling air changes 180 degrees.

In the forward serpentine circuit, the first up pass 4 begins at the platform 16 in flow communication with the second inlet channel 46 and terminates directly under the tip floor 42 in a first forward flow bend 62. The first bend 62 is defined by the shorter partition separating the two channels 3,4, with the middle channel 3 beginning at the first bend 62 and terminating at the platform 16 in a second forward bend 64.

The second bend 64 is defined by the shorter partition separating the two channels 2,3 and again turns the primary flow 180 degrees from the middle pass 3 to the last pass 2. And, the first inlet channel 44 joins in flow communication both the middle down pass 3 and last up pass 2 at the common second flow bend 64.

The aft serpentine circuit matches the forward serpentine circuit in opposite or mirror configuration. The aft first up pass 5 begins at the platform 16 in flow communication with the corresponding third inlet channel 48 and terminates directly below the tip floor 42 in a first aft flow bend 66 joining the middle or second down pass 6. The aft first bend 66 is defined by the shorter partition between the two passes 5,6 and permits 180 degree turning of the flow between those two channels directly inside the tip floor.

The middle down pass 6 terminates at the platform 16 in an aft second flow bend 68 which again turns the flow 180 degrees into the last pass 7. The second bend 68 is defined by the shorter partition between the two passes 6,7. And, the fourth inlet channel 50 joins in flow communication both the middle and last passes 6,7 of the aft serpentine circuit at the corresponding second flow bend 68.

Whereas the forward and aft first flow bends 62,66 are disposed directly under the tip floor 42, the forward and aft second flow bends 64,68 are disposed at the platform 16 in preferred cooperation with the corresponding supplemental inlet channels 44,50.

Since the four inlet channels 44-50 are as large as possible to reduce blade weight, the second and third primary inlet channels 46,48 separately converge in flow area radially outwardly from the metering plate 52 to the corresponding first passes 4,5 of the forward and aft serpentine circuits.

In contrast, the first and fourth supplemental inlet channels 44,50 diverge in flow area radially outwardly from the metering plate 52 to the corresponding second flow bends 64,68 of the forward and aft serpentine circuits. The first inlet channel 44 diverges to join both the middle and last passes 3,2 of the forward serpentine circuit at the corresponding second bend 64. Similarly, the fourth inlet channel 50 diverges to join both middle and last passes 6,7 of the aft serpentine circuit at the corresponding second flow bend 68.

In this way, both forward and aft second bends 64,68 have unobstructed configurations permitting both the efficient turning of the spent primary cooling flow from the middle to the last passes of the two serpentine circuits, as well as efficient mixing with the supplemental cooling flow from the corresponding supplemental inlet channels 44,50.

The first inlet channel 44 therefore has a cross sectional flow area which is greater than the flow area of each of the middle and last passes 3,2 of the forward serpentine circuit where they join together at the second flow bend 64. And, the fourth inlet channel 50 has a cross sectional flow area greater than each of the middle and last passes 6,7 of the aft serpentine circuit where they join the second flow bend 68.

The forward and aft impingement cooling channels 1,8 illustrated in FIGS. 1 and 2 may have any conventional configuration. For example, the partition 40 between the forward impingement channel 1 and the last forward pass 2 is perforate with a row of impingement holes 70 distributed from root to tip directly behind the leading edge 26 for impingement cooling thereof from both the primary and supplemental cooling air channeled through the forward last pass 2.

Similarly, the partition 40 between the aft impingement channel 8 and the last aft pass 7 is perforate with another row of impingement holes 70 distributed from root to tip directly before the trailing edge 28 for impingement cooling thereof using both the primary and supplemental cooling flow channeled through the last pass 7.

As shown in FIG. 2, the first row of impingement holes 70 extends through the partition 40 generally perpendicular to the back side of the leading edge 26. And, the aft row of impingement holes 70 is inclined laterally through the partition toward the airfoil pressure side 22 just before the trailing edge 28.

The remaining partitions 40 of the forward and aft serpentine circuits illustrated in FIGS. 1 and 2 are typically imperforate to ensure full flow of the limited cooling air through the corresponding passes in turn or sequence. However, the partition 40 between the second and last forward passes 3,2 of the first serpentine circuit preferably includes a single diversion or bleed hole 72 in flow communication therebetween at the radially outer end of the airfoil near or suitably below the tip floor 42.

Similarly, the partition 40 between the second and last aft passes 6,7 of the aft serpentine circuit includes an aft diversion or bleed hole 72 in flow communication therebetween again at the radially outer end of the airfoil near or just below the tip floor 42.

The forward bleed hole 72 is preferably disposed radially in elevation below the forward first bend 62 to divert some of the primary cooling air from the top of the middle pass 3 to the top of the last pass 2 to additionally cool the airfoil leading edge 26 near the tip 36 to locally reduce thermal distress in this region of the tip.

Similarly, the aft bleed hole 72 is disposed in elevation radially at the aft first bend 66 to divert the primary cooling air at the top of the middle pass 6 to the top of the aft pass 7 to provide additional cooling of the airfoil tip in the trailing edge region for reducing thermal distress.

The forward and aft bleed holes 72 are better illustrated in elevation in FIGS. 3 and 4 and have generally oval or racetrack configurations with their major axis extending radially, and their minor axis extending transversely between the opposite pressure and suction sides of the airfoil. The two bleed holes may have similar sizes of about 30×60 mils (0.76×1.5 mm) for diverting sufficient primary flow between the middle and last passes of the two serpentine circuits.

The bifeed serpentine cooled turbine blade 10 illustrated in FIG. 1 may be used for enhanced performance in the gas turbine engine 12, which is otherwise conventional. As indicated above, the engine includes a compressor for pressurizing air which is then mixed with fuel in a combustor for generating hot combustion gases which are discharged through high and low pressure turbines. The high pressure turbine powers the compressor. And, the low pressure turbine powers a fan in the typical aircraft turbofan engine configuration, or may power an external drive shaft in other configurations.

The first stage high pressure turbine of the engine includes a full row of the turbine blades 10 extending radially outwardly from their supporting rotor disk. The pressurized cooling air 34 is suitably bled from the compressor in any conventional manner and channeled to the row of turbine blades.

Each turbine blade is given a predetermined, total flowrate of the cooling air 34 for the entire cooling thereof.

The bifeed cooling configuration illustrated in FIG. 1 includes two inlet channels for each of the two serpentine cooling circuits, with the corresponding four metered inlets 54-60.

In a preferred embodiment, the total flowrate of the cooling flow to each turbine blade is metered to divert some of the cooling flow from the second and third primary inlet channels 46,48 instead to the supplemental first and fourth inlet channels 44,50, respectively, to increase cooling of the leading and trailing edge portions of the airfoil at the expense of the midchord region therebetween. A majority, but not all, of the inlet cooling air is channeled to the corresponding first and second passes of the two serpentine circuits then to the last passes 2,7 thereof, which additionally receive the supplemental inlet flow from the corresponding supplemental inlet channels 44,50.

For example, each of the two serpentine circuits illustrated in FIG. 1 would ordinarily have last passes without the supplemental inlets, and the two inlet channels 46,48 would each receive 100 percent of their intended flow. By introducing the supplemental inlets, the original 100 percent flow in each serpentine is redistributed, with a majority thereof, about two thirds, being channeled as the primary flow in the corresponding first passes 4,5, with the remaining minority, about one third, of the flow instead being provided to the supplemental inlet channels 44,50.

In this way, the same amount of cooling flow may be provided to the improved turbine blade illustrated in FIG. 1 relative to a reference blade without the supplemental inlet channels, which will preferentially increase cooling effectiveness of the leading and trailing edge regions of the airfoil at the expense of the midchord region thereof.

Correspondingly, the midchord region of the airfoil will have increased heating and operating temperature thereof, while the leading and trailing edge regions of the airfoil will have decreased operating temperature. This redistribution of the limited cooling air in the airfoil will correspondingly reduce the differential temperatures experienced by the airfoil during operation, and correspondingly reduce thermal stress therein.

Figure 5:
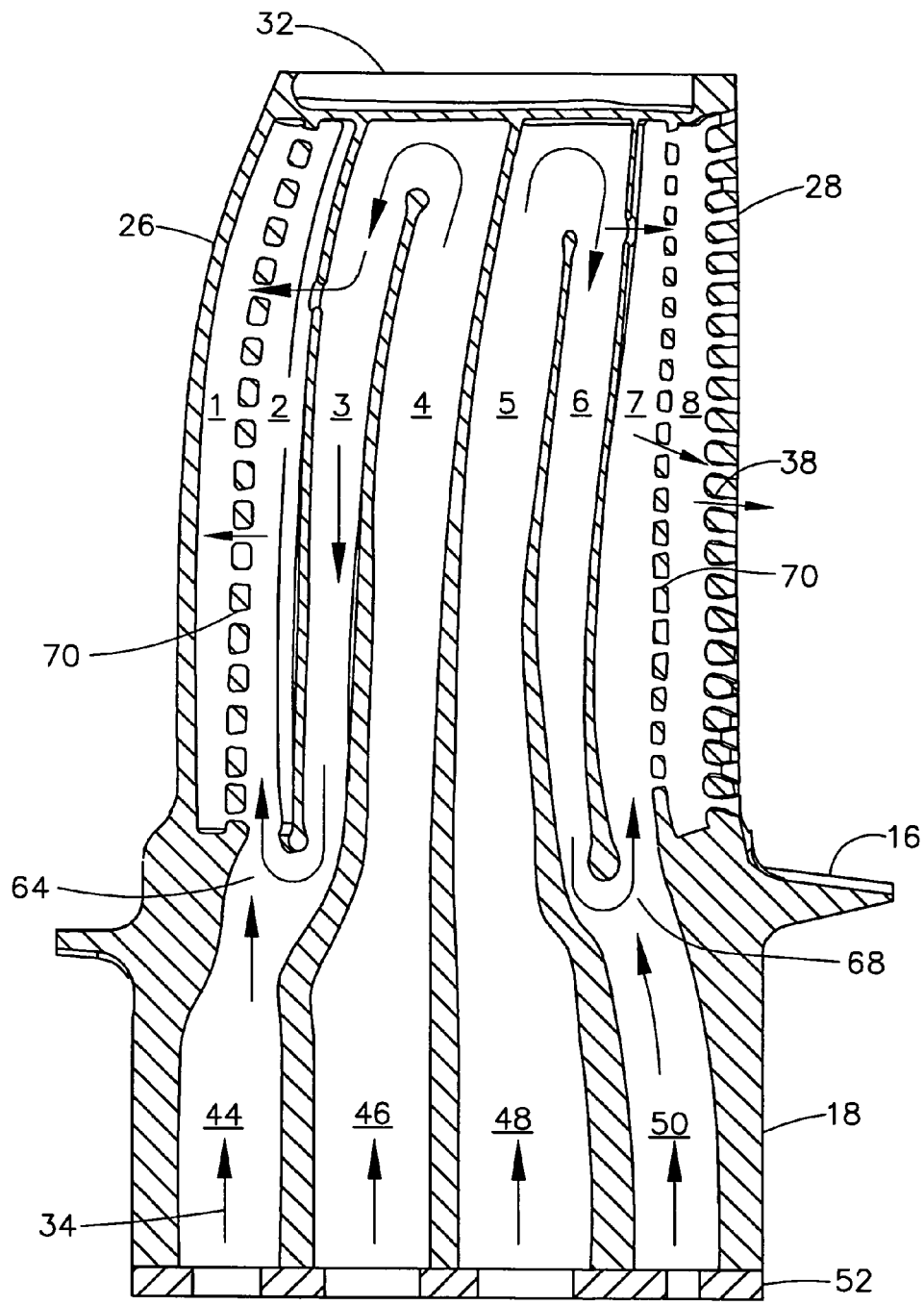
FIG. 5 is an axial sectional view of the airfoil illustrated in FIG. 1 including the internal cooling circuits therein.

FIG. 5 illustrates the normal distribution of the cooling flow 34 during operation of an undamaged turbine blade.

In the normal operation illustrated in FIG. 5, the primary cooling flow is channeled in turn through the three passes 4,3,2 of the forward serpentine circuit and the three passes 5,6,7 of the aft serpentine circuit to feed their corresponding impingement flow channels 1,8. And, the supplemental cooling airflows through the corresponding inlet channels 44,50 to join the primary cooling flow in the corresponding forward and aft second flow bends 64,68 which together flow into the last passes 2,7 of the serpentine circuits to feed the impingement channels 1,8.

The large flow area of the inlet channels 44,50 where they join their corresponding flow bends 64,68 provides an aerodynamically smooth configuration in which the primary and secondary cooling flows may mix together with minimal pressure losses.

Figure 6:
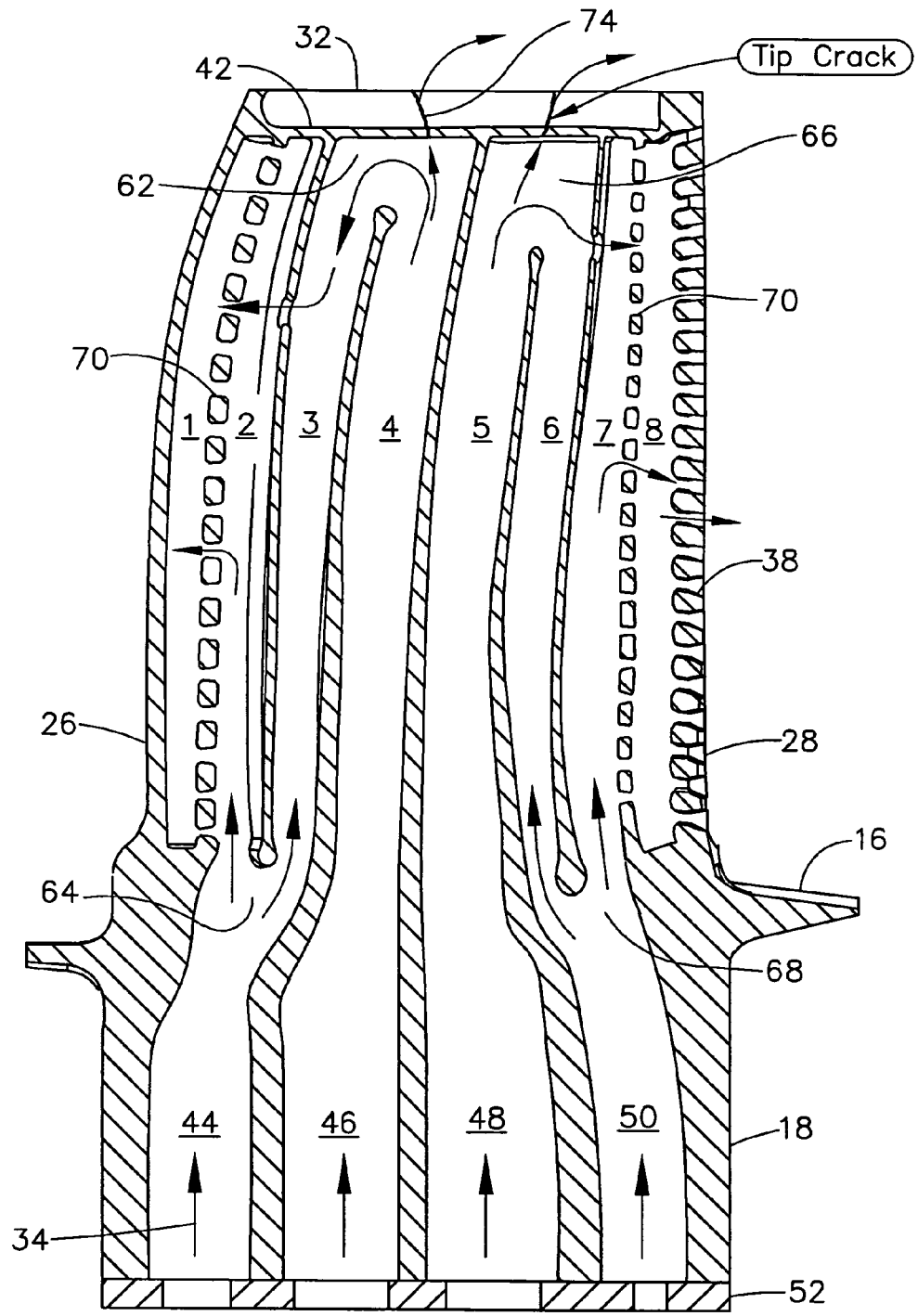
FIG. 6 is an axial sectional view of the airfoil, like FIG. 5, introducing a pair of tip cracks therein.

FIG. 6, in contrast, shows the different distribution of the cooling flow 34 when the blade is damaged by one or more tip cracks 74 which might be experienced late in life of the turbine blade in extended operation.

Typical turbine blades operated in gas turbine engines experience thermal distress primarily at the airfoil tip 32 which may lead to one or more tip cracks 74 therein. One or more of such cracks 74 may extend through the tip floor 42 in one or both of the two serpentine circuits and provide a small opening through which the primary cooling flow may leak, such as at either one of the first bends 62,66.

In a conventional blade, such leaks would deprive the remaining passes of the serpentine circuits of adequate cooling flow and lead to increased thermal distress and rapid thermal failure of the blade depending upon the severity of tip cracking.

However, by introducing the supplemental inlet channels 44,50 as shown in FIG. 6, a sufficient portion of the total flowrate of cooling air provided to the blade may be metered to these channels and into not only the last passes 2,7 of the serpentine circuits but also the middle passes 3,6. The supplemental cooling air may therefore effectively offset the loss of cooling flow from the tip leak.

The supplemental flow should be sufficient to adequately cool the leading and trailing edge regions of the airfoil at the last passes of the two serpentine circuits and their corresponding impingement channels in the event of such tip cracking. And, the supplemental cooling flow should also be sufficient for flowing back through the middle channels 3,6 deprived of adequate primary cooling flow for ensuring effective cooling thereof.

The large flow areas of the supplemental inlet channels 44,50 where they meet the corresponding flow bends 64,68 provides an aerodynamically smooth configuration for splitting the supplemental cooling air to feed both middle and last passes 3,2 of the forward serpentine and the middle and last passes 6,7 of the aft serpentine with minimal pressure losses.

Whereas tip cracking of a conventionally cooled turbine blade may lead to severe thermal distress and failure in a relatively short operating time such as hours, the introduction of the supplemental cooling of the turbine blade illustrated in FIG. 6 can effectively extend the useful life of even a cracked turbine blade for hundreds of operating hours until the next maintenance outage is reached during which the damaged blade will be inspected and replaced in accordance with normal maintenance procedures.

The bifeed serpentine cooled blade disclosed above may therefore be operated with effective airfoil cooling thereof during normal, undamaged operation notwithstanding the introduction of the dual inlet channels for the two serpentine circuits. And, in the event of undesirable tip cracking during extending blade life, the dual inlets for each of the two serpentine circuits ensure adequate cooling without flow starvation for maintaining the cooling integrity of the so damaged blade.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   forward and aft serpentine cooling circuits, terminating in corresponding forward and aft impingement channels, with each circuit having two metered inlets for distributing more inlet flow to first passes thereof than to last passes thereof;
   a hollow airfoil having partitions joining opposite pressure and suction sides and spaced chordally between opposite leading and trailing edges to define said serpentine circuits, and cooperating impingement channels;
   a dovetail integrally joined to said airfoil at a platform, and including four inlet channels separately joined to said serpentine circuits; and
   a metering plate joined to said dovetail to cover said four inlet channels and distribute more flow to said first passes than to said last passes;
   wherein:
      an tip airfoil tip of said hollow airfoil comprises a tip floor recessed therein to directly cover said forward and aft serpentine circuits;
      said four inlet channels have larger flow areas than said serpentine circuits; and
      said metering plate includes first, second, third, and fourth aperture inlets being smaller in flow area than said four inlet channels to correspondingly meter said cooling flow therethrough.

2. A blade according to claim 1 wherein said inlet channels comprise:
   a first inlet channel extending through said dovetail and diverging to join said forward serpentine circuit at said last pass thereof;
   a second inlet channel extending through said dovetail and converging to join said forward serpentine circuit at said first pass thereof;
   a third inlet channel extending through said dovetail and converging to join said aft serpentine circuit at said first pass thereof; and
   a fourth inlet channel extending through said dovetail and diverging to join said aft serpentine circuit at said last pass thereof.

3. A blade according to claim 2 wherein:
   said forward serpentine circuit includes said forward first pass commencing at said platform in flow communication with said second inlet channel and terminating at said tip floor in a forward first flow bend joining a second pass which in turn terminates at said platform in a forward second flow bend joined to said first inlet channel and said forward last pass; and
   said aft serpentine circuit includes said aft first pass commencing at said platform in flow communication with said third inlet channel and terminating at said tip floor in an aft first flow bend joining an aft second pass which in turn terminates at said platform in an aft second flow bend joined to said fourth inlet channel and said aft last pass.

4. A blade according to claim 3 wherein said first and fourth inlet channels diverge at said forward and aft second bends, respectively.

5. A blade according to claim 3 wherein:
   said first inlet channel at said forward second and last passes has a flow area greater than either pass; and
   said fourth inlet channel at said aft second and last passes has a flow area greater than either pass.

6. A blade according to claim 3 wherein:
   said partition between said forward impingement channel and said forward last pass is perforate behind said leading edge for impingement cooled thereof;
   said partition between said aft impingement channel and said aft last pass is perforate before said trailing edge for impingement cooling thereof;
   said partition between said forward second and last passes is imperforate except for a forward bleed hole therebetween near said tip floor; and said partition between said aft second and last passes is imperforate except for an aft bleed hole therebetween near said tip floor.

7. A blade according to claim 3 wherein said forward bleed hole is disposed below said forward first bend to additionally cool said airfoil leading edge near said tip, and said aft bleed hole is disposed at said aft first bend to additionally' cool said airfoil trailing edge near said tip.

8. A method of cooling said blade according to claim 3 in a gas turbine engine comprising:
   channeling a total flowrate of said cooling flow to said blade; and
   metering said total flowrate to divert some of said flow from said second and third inlet channels instead to said first and fourth inlet channels to increase operating temperature of said airfoil over the midchord region thereof while decreasing temperature of said airfoil along said leading and trailing edges as combustion gases flow over said airfoil.

9. A turbine blade comprising:
   an airfoil extending in chord between leading and trailing edges and extending in span from a root at an integral platform joined to a dovetail to an opposite tip;
   a first serpentine cooling circuit extending through said airfoil forward from the midchord thereof toward said leading edge, and terminating in a forward impingement cooling circuit;
   a second serpentine cooling circuit extending through said airfoil aft from said first serpentine circuit toward said trailing edge, and terminating in an aft impingement cooling channel;
   a first inlet channel extending through said dovetail to join said first serpentine circuit at a forward last pass thereof;
   a second inlet channel extending through said dovetail to join said first serpentine circuit at a forward first pass thereof;
   a third inlet channel extending through said dovetail to join said second serpentine circuit at an aft first pass thereof;
   a fourth inlet channel extending through said dovetail to join said second serpentine circuit at an aft last pass thereof; and
   a metering plate joined to said dovetail to cover said four inlet channels and distribute more cooling flow to said second and third inlet channels than to said first and fourth inlet channels, respectively;
   wherein:
      said airfoil tip comprises a tip floor recessed therein to directly cover said first and second serpentine circuits;

said four inlet channels have larger flow areas than said serpentine circuits; and said metering plate includes first, second, third, and fourth aperture inlets being smaller in flow area than said four inlet channels to correspondingly meter said cooling flow therethrough.

10. A blade according to claim 9 further comprising a plurality of partitions joining together opposite pressure and suction sides of said airfoil, and spaced chordally apart to define corresponding channels of said two serpentine circuits terminating at said impingement channels and fed by said inlet channels extending through said dovetail.

11. A blade according to claim 10 wherein:

said first serpentine circuit includes said forward first pass commencing at said platform in flow communication with said second inlet channel and terminating at said tip floor in a forward first flow bend joining a second pass which in turn terminates at said platform in a forward second flow bend joined to said first inlet channel and said forward last pass; and said second serpentine circuit includes said aft first pass commencing at said platform in flow communication with said third inlet channel and terminating at said tip floor in an aft first flow bend joining an aft second pass which in turn terminates at said platform in an aft second flow bend joined to said fourth inlet channel and said aft last pass.

12. A blade according to claim 11 wherein:

said second and third inlet channels converge at said forward and aft first passes, respectively; and said first and fourth inlet channels diverge at said forward and aft second bends, respectively.

13. A blade according to claim 12 wherein:

said first inlet channel at said forward second and last passes has a flow area greater than either pass; and said fourth inlet channel at said aft second and last passes has a flow area greater than either pass.

14. A blade according to claim 11 wherein:

said partition between said forward impingement channel and said forward last pass is perforate behind said leading edge for impingement cooled thereof;

said partition between said aft impingement channel and said aft last pass is perforate before said trailing edge for impingement cooling thereof;

said partition between said forward second and last passes includes a forward bleed hole therebetween near said tip floor; and said partition between said aft second and last passes includes an aft bleed hole therebetween near said tip floor.

15. A blade according to claim 14 wherein said forward bleed hole is disposed below said forward first bend to additionally cool said airfoil leading edge near said tip, and said aft bleed hole is disposed at said aft first bend to additionally cool said airfoil trailing edge near said tip.

16. A blade according to claim 14 wherein said partition between said aft impingement channel and said aft last pass includes impingement holes inclined laterally therethrough for impingement cooling the back of said airfoil pressure side before said trailing edge.

17. A method of cooling said blade according to claim 11 in a gas turbine engine comprising:

channeling a total flowrate of said cooling flow to said blade; and metering said total flowrate to divert some of said flow from said second and third inlet channels instead to said first and fourth inlet channels to increase operating temperature of said airfoil over the midchord region thereof while decreasing temperature of said airfoil along said leading and trailing edges as combustion gases flow over said airfoil.

18. A method of cooling said blade according to claim 11 in a gas turbine engine comprising:

channeling a total flowrate of said cooling flow to said blade;

operating said blade in said engine with a crack in said tip causing some of said cooling flow to leak from one of said serpentine circuits; and metering a sufficient portion of said total flowrate through said first and fourth inlet channels and into said serpentine circuits to effectively offset loss of cooling flow from said tip leak.

* * * * *

UNITED STATES PATENT AND TRADEMARK OFFICE
CERTIFICATE OF CORRECTION

| | | |
|---|---|---|
| PATENT NO. | : 8,591,189 B2 | Page 1 of 1 |
| APPLICATION NO. | : 11/602137 | |
| DATED | : November 26, 2013 | |
| INVENTOR(S) | : Correia et al. | |

It is certified that error appears in the above-identified patent and that said Letters Patent is hereby corrected as shown below:

In the Claims:

In Column 9, Line 30, in Claim 1, delete "an tip" and insert -- a tip --, therefor.

In Column 10, Line 25, in Claim 7, delete "additionally'" and insert -- additionally --, therefor.

Signed and Sealed this
Twenty-fifth Day of March, 2014

Michelle K. Lee
*Deputy Director of the United States Patent and Trademark Office*